United States Patent [19]

Chattha

[11] Patent Number: 4,609,719

[45] Date of Patent: Sep. 2, 1986

[54] HYDROXYL TERMINATED AZOMETHINES AND HIGH GLASS TRANSITION TEMPERATURE POLYETHER PRODUCTS PRODUCED THEREFROM

[75] Inventor: Mohinder S. Chattha, Livonia, Mich.

[73] Assignee: Ford Motor Company, Dearborn, Mich.

[21] Appl. No.: 811,182

[22] Filed: Dec. 20, 1985

Related U.S. Application Data

[62] Division of Ser. No. 714,141, Mar. 20, 1985.

[51] Int. Cl.$^4$ .............................................. C08G 59/62
[52] U.S. Cl. ........................................ 528/98; 528/99; 528/104; 528/118; 528/407
[58] Field of Search .................... 528/104, 99, 98, 118, 528/407

[56] References Cited

U.S. PATENT DOCUMENTS

| 3,516,970 | 6/1970 | Webb . |
| 3,516,971 | 6/1970 | Webb . |
| 3,526,611 | 9/1970 | Webb . |
| 4,129,556 | 12/1978 | Zondler et al. ................... 528/99 X |
| 4,367,328 | 1/1983 | Bertram et al. ................... 528/99 X |
| 4,410,681 | 10/1983 | Prindle .............................. 528/99 X |

OTHER PUBLICATIONS

Synthesis and Thermal Stability of Structurally Related Aromatic Schiff Bases and Acid Amides, Delman, Stein and Simms, Macromol Sci. (Chem.) Al(1), 147-178 (1967).

*Primary Examiner*—Earl Nielsen
*Attorney, Agent, or Firm*—Lorraine S. Melotik; Roger L. May

[57] ABSTRACT

This invention is directed to hydroxyl terminated azomethines formed by reacting aromatic dialdehydes or aromatic diketones with hdyroxyl-amino compounds. These azomethines may be reacted with epoxy resin to produce polymeric material having high glass transition temperatures.

7 Claims, No Drawings

HYDROXYL TERMINATED AZOMETHINES AND HIGH GLASS TRANSITION TEMPERATURE POLYETHER PRODUCTS PRODUCED THEREFROM

This is a division, of application Ser. No. 714,141, filed Mar. 20, 1985.

Reference is made to concurrently filed and commonly assigned related U.S. application Ser. No.712,055 U.S. Pat. No. 4,595,761, entitled "Dicarboxylic Acid Azomethines and High Glass Transition Temperature Polyester Products Produced Therefrom", to Chattha. Reference is also made to commonly assigned copending U.S. application Ser. No. 711,881 entitled "Hydroxyl Terminated Azomethines and High Glass Transition Temperature Polyether Products Produced Therefrom", filed Mar. 15, 1985 to Chattha.

TECHNICAL FIELD

This invention relates to hydroxyl terminated, aromatic azomethines which may be reacted with epoxy resins to produce polymeric materials with high glass transition temperatures. Azomethines are compounds containing a ($>$C=N—) unit in their backbone.

BACKGROUND OF THE INVENTION

Both low and high molecular weight azomethine polymers (commonly termed Schiff-base polymers) have been described in literature and various patents. Generally, these azomethine polymers are made by reacting aromatic dialdehydes with aromatic diamines. The preparation of low molecular weight polyazomethines by solution polymerization has been described by Delman et al in Macromol Sci. Chem. Al. (1) 147-148 (67). U.S. Pat. Nos. 3,516,970, 3,516,971 and 3,526,611 describe the synthesis by melt polymerization of high molecular weight Schiff-base polymers. The high molecular weight azomethine polymers are taught as being highly insulating and thermally stable, i.e., capable of withstanding high temperatures for sustained periods of time without undergoing significant degradation or phase change. They have thus been suggested for aerospace applications requiring polymers having high temperature stability. While the hydroxyl terminated azomethines of this invention are of relatively low molecular weight, we have found that they have good thermal stability and high melting points.

It is known in the art that hydroxyl functional materials may be reacted with epoxy resins to form thermoplastic and thermoset materials. We have now found that the hydroxyl terminated aromatic azomethines of this invention, when reacted with epoxy resins, produce polyether materials with high glass transition temperatures. Such high glass transition temperature polyethers would be useful in applications requiring materials having good thermal stability and relatively high melting points.

BRIEF DESCRIPTION OF THE INVENTION

This invention is directed to hydroxyl terminated aromatic azomethines which have a high glass transition temperature. These azomethines may be of two different types.

The first type of azomethine is formed by reacting:

(A) aromatic compounds having the formula: ORC-X-CRO, wherein X is a phenyl group, each R is an alkyl group having 1-5 carbon atoms or, preferably, H, and the CRO groups are linked through X at the 1,3 or 1,4 positions; and (B) compounds having the formula: $H_2N$-Y-OH, wherein Y is a phenyl or a pyridine group and the $H_2N$ group and the OH group are linked through Y at the 1,3 or 1,4 positions, the compounds (A) and (B) being reacted in about a 1:2 molar ratio and under conditions wherein the CRO groups of (A) and the $NH_2$ group of (B) react.

The second type of azomethine is formed by reacting:

(A') diamine compounds having the formula: $H_2N$-Y'-$NH_2$, wherein Y' is a pyridine group or an arylene moiety containing one or two phenylene rings and the $NH_2$ groups are linked through Y' at the 1,3 or 1,4 positions; and (B') aromatic compounds having the formula: OR'C-X'-OH, wherein X' is a phenyl group, R' is an alkyl group having 1-5 carbon atoms or, preferably, H, and the CR'O group and the OH group are linked through X' at the 1,3 or 1,4 positions, the compounds (A') and (B') being reacted in about a 1:2 molar ratio and under conditions wherein the $NH_2$ groups of (A') and the CR'O group of (B') react.

The two phenylene rings of the arylene moiety may be a diphenylene group or a group of two phenylene rings linked by a functionality, which may be selected from the group consisting of O, S, $SO_2$, NH, C=O, N-$CH_3$ and $CH_2$.

This invention is also directed to the polyether products produced by reacting epoxy resins and the hydroxyl terminated aromatic azomethines described above.

Advantageously, the high melting azomethines of this invention, when reacted with epoxy resins, form high glass transition temperature polyethers which are suitable for use as, for example, high temperature adhesives, composites, coatings and potting compounds.

DETAILED DESCRIPTION OF THE INVENTION

This invention is directed to hydroxyl terminated aromatic azomethines. These azomethines, containing two hydroxyl groups, are of two types. The first type of hydroxyl terminated azomethine is formed by reacting aromatic diketones or aromatic dialdehydes (compound A) with amine compounds having a hydroxyl group (compound B) in about a 1:2 molar ratio, as described briefly above. The second type of hydroxyl terminated azomethine is formed by reacting diamines, having a pyridine or arylene moiety, (compound A') with aromatic hydroxy ketones or aldehydes (compound B') in about a 1:2 molar ratio. Each of the reactants for forming these hydroxyl terminated azomethines will be discussed in greater detail.

The aromatic diketones or aromatic dialdehydes reacted to form the first type of hydroxyl terminated azomethine of this invention comprise compounds having the formula: ORC-X-CRO, wherein X is a phenyl group and each R is an alkyl group having 1–5 carbon atoms or H. As is well known in the art, if R is an alkyl group, this compound is an aromaic diketone or, if R is hydrogen, this compound is an aromatic dialdehyde. Preferably, R of this compound is hydrogen, since the aldehyde group is more reactive with an amine group than is the ketone group. The CRO groups are linked through X at the 1,3 or 1,4 position. As has been discussed above, these azomethines can be reacted with epoxy resins to form thermoplastic and thermosetting polyethers. Azomethines formed from such aromatic compounds whose CRO groups are linked through the phenyl group X at the 1,3 positions, as compared to the 1,4 positions, yield polyethers having increased flexibility. On the other hand, azomethines formed from such compounds wherein the CRO groups are at the 1,4 positions of X, as compared to the 1,3 positions, yield polyethers having higher glass transition temperatures. It is preferred, in order to form high glass transition temperature polyethers, to thus employ the azomethines formed from the 1,4 position compounds. Exemplary of the aromatic diketones and aromatic dialdehydes which may be employed to form the azomethines of this invention are terephthaldialdehyde, isophthaladehyde, and diacetylbenzene, with terephthaldialdehyde being preferred. Mixtures of suitable aromatic diketones and/or aromatic dialdehydes, may also be used as component (A) in forming the first type of the azomethine of this invention.

The amine compounds which are reacted with compound (A) to form this first type of azomethine contain a terminal hydroxyl group and are selected from compounds having the formula: $H_2N$-Y-OH, wherein Y is a phenyl or pyridine group and the $H_2 N$ group and the OH group are linked through Y at the 1,3 or 1,4 positions. The hydrogens of the phenyl or pyridine group may be substituted by non-interfering functionality. Preferably, at most, only one or two of the hydrogens of the phenyl or pyridine group are substituted. Exemplary of non-interfering functionality which may be substituted for the hydrogens on the phenyl or pyridine group, (i.e., other than at the linking positions at Y for the amine and hydroxyl group) are groups such as methyl, methoxy, and chloro. Linking the amine and hydroxyl groups through Y at the 1,3 positions, as compared to the 1,4 positions, results in azomethines which form polyethers having increased flexibility. On the other hand, linking the amine and hydroxyl groups through the 1,4 positions results in polyethers having higher glass transition temperatures. it is preferred, in order to form high glass transition temperature polyethers, to thus employ the azomethines formed from the 1,4 position compounds. Amine-hydroxyl compounds which may be employed to form the first type of azomethine of this invention include, but are not limited to, 2-amino-6-hydroxypyridine, m-amino-phenol, and p-aminophenol. As would be apparent to those skilled in the art, mixtures of the amino-hydroxyl compounds may also be employed as component (B) in this invention.

In forming the first type of azomethine of this invention, compound (A) and compound (B) are reacted in about a 1:2 molar ratio under conditions wherein the CRO groups of compound (A) and the amine group of compound (B) react. By reacting compound (A) and compound (B) in about a 1:2 molar ratio, all of the CRO groups will be reacted. While it is not generally necessary, compound (B) may be employed in the reaction mixture in a slight excess of this ratio, e.g., in about 1:2-2.2 molar ratio, so as to insure that compound (A) and compound (B) are reacted in about a 1:2 molar ratio and thus all of the CRO groups of compound (A) will be reacted.

Exemplary of one embodiment of the first type of azomethine of this invention comprises the azomethine formed by the reaction of terephthaldialdehyde with p-aminophenol as shown in the following equation:

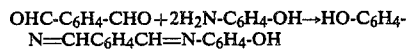

The diamines reacted to form the second type of hydroxyl terminated azomethine of this invention comprise compounds having the formula $H_2N$-Y'-$NH_2$, wherein Y'is a pyridine group or an arylene moiety containing one or two phenylene rings and the $NH_2$ groups are linked through Y' at the 1,3 or 1,4 positions. The hydrogens of the pyridine or the phenylene rings may be substituted by non-interfering functionality. Preferably, at most, only one or two of the hydrogens of the phenylene rings or pyridine group are substituted. Exemplary of non-interfering functionality which may be substituted for the hydrogen on the pyridine or phenylene rings are groups such as methyl, methoxy, and chloro. The two phenylene rings of the arylene moiety may be a diphenylene group or a group consisting of two phenylene rings linked by a functionality selected from the group consisting of O, S, $SO_2$, NH, C=O, N-$CH_3$ and $CH_2$. Linking the amine groups through Y' at the 1,3 positions, as compared to the 1,4 positions, results in azomethine which form polyethers having increased flexibility. On the other hand, linking the amine groups through Y' at the 1,4 positions results in polyethers having higher glass transition temperatures. It is preferred, in order to form high glass transition temperature polyethers, to thus employ the azomethines formed from the 1,4 position compounds Diamines which may be employed to form the second type of azomethine of this invention include, but are not limited to, p-phenylenediamine, diaminodiphenyl oxide, diaminodiphenyl sulfone, and diaminodiphenyl ethylene.

The aromatic hydroxy compounds (B') which are reacted with the diamines to form the second type of azomethine of this invention have the formula: OR'C-X'-OH, wherein X' is a phenyl group and R' is H or an alkyl group having 1–5 carbon atoms. Thus, this compound is an aromatic hydroxy ketone or aldehyde. Preferably R' of this compound is hydrogen, since the aldehyde group is more reactive with an amine group than is the ketone group. The CR'O group and the OH group are linked through X' at the 1,3 or 1,4 positions. Azomethines formed from such aromatic hydroxy compounds wherein the CRO group and OH group are linked through the phenyl group X' at the 1,3 positions, as compared to the 1,4 positions, yield polyethers having increased flexibility. On the other hand, azomethines formed from compounds wherein the CR'O group and OH group are at the 1,4 positions of X', as compared to the 1,3 positions, yield polyethers having higher glass transition temperatures. It is preferred, in order to form high glass transition temperature polyethers, to thus employ the azomethines formed from the 1,4 position compounds. Exemplary of the aromatic hydroxyl compounds (B') which may be employed in this invention include, but are not limited to, m- and p- benzaldehyde and m- and p- hydroxy acetophenone. As would be apparent to those skilled in the art, mixtures of such aromatic hydroxyl compounds may be employed as component (B') in this invention.

In forming the second type of azomethine of this invention, compound (A') and compound (B') are reacted in about a 1:2 molar ratio under conditions wherein the amine groups of (A') and the CR'O group of compound (B') react. By reacting compound (A') and compound (B') in about a 1:2 molar ratio, all of the $NH_2$ groups will be reacted. Although it is generally not necessary, compound (B') may be employed in the reaction mixture in a slight excess of this ratio, e.g., about 1:2–2.2, so as to insure that compound (A') and compound (B') are reacted in about a 1:2 molar ratio and thus all of the amine groups of compound (A') are reacted.

Exemplary of one embodiment of this second type of azomethine of this invention comprises the azomethine formed by the reaction of p-phenylenediamine and m-hydroxybenzaldehyde, as shown in the following equation:

$$H_2N\text{-}C_6H_4\text{-}NH_2 + 2OHC\text{-}C_6H_4\text{-}OH \rightarrow OH\text{-}C_6H_4\text{-}CH = N\text{-}C_6H_4\text{-}N = CH\text{-}C_6H_4\text{-}OH$$

Generally in forming the oligomers of the invention, the compounds are dissolved separately in suitable solvents and then the solutions are mixed and heated to an elevated temperature whereafter the compounds react to form the azomethines. This azomethine product generally separates out in a crystalline form which can be easily recovered from the solvent. Exemplary of solvents which may be employed for making the azomethine in this manner include ethanol, acetone, dimethyl formamide and dimethyl acetamide. Catalysts, while not generally being required to catalyze this reaction, particularly when employing aldehydes rather than ketones, may be employed. Exemplary of such catalysts are p-toluene sulfonic acid, phosphoric acid and sulfuric acid.

While the above procedure describes a method for making the azomethine, its description is not meant to be limiting to the azomethine of this invention and selection of a method to produce the azomethines of this invention from components (A) and (B) and components (A') and (B') would be well within the skill of those in the art.

Azomethines of the invention are particularly useful in making high glass transition temperature polyether products such as adhesives, composites, coatings and potting compounds, by reacting the azomethines with epoxy resins. If the azomethines of this invention are reacted with diepoxide materials, high glass transition temperature thermoplastic polyethers are formed. When reacted with epoxies having more than two epoxide groups per molecule, the dihydroxyl azomethines of this invention produce high glass transition temperature thermosets. Epoxy resins which may be reacted with the dihydroxyl azomethine azomethines of this invention include, but are not limited to, those having, on average, two or more epoxide groups per molecule. A large number of such polyepoxide resins are known to those skilled in the art. Exemplary of such polyepoxide resins are those derived from a dihydric phenol or dihydric alcohol and an epihalohydrin. Examples of epihalohydrins are epichlorohydrin, epibromohydrin and epiiodohydrin with epichlorohydrin being preferred. Dihydric phenols and dihydric alcohols are exemplified by resorcinol, hydroquinone, Bisphenol A, p,p'-dihydroxy benzophenone, p,p'-dihydroxy phenol, p,p'-dihydroxy diphenyl ethane, bis-(2-hydroxy naphthyl) methane, 1,5-dihydroxy naphthalene, ethylene glycol, propylene glycol, 1,4-butane diol, hyrogenated Bisphenol A, 1,4-cyclohexane diol, 1,3-cyclopentane diol, cyclohexane dimethanol, and the like. These polyepoxide resins, as is well known in the art, are made in the desired molecular weights by reacting the epihalohydrin and the diols in various ratios, or by reacting a dihydric phenol with a lower molecular weight polyepoxide resin. Other polyepoxide resins are the glycidyl polyethers of Bisphenol A. Examples of commercially available epoxy resins of the type described above and useful in this invention to form, e.g., composites, include Epon 828, available from and a trademark of Shell Chemical Company (Houston, Tex.). Mixtures of the epoxy resins may also be employed as the epoxy resin reacted with the dihydroxyl azomethines to form the polyethers of this invention. While some polyepoxide resins have been discussed as exemplary for use in forming the polyether product of this invention, their disclosure is not to be considered limiting to the epoxy resin. Other epoxides will be apparent to those skilled in the art. Generally, the epoxy resin and the azomethine of this invention are reacted in about a 1–5:1 ratio of epoxide to hydroxyl groups, more preferably in about a 1–2:1 ratio of epoxide to hydroxyl group. However, this ratio is not meant to be limiting to this invention. The optimal ratio would depend on the application and type of composition being formed and selection of such a ratio would be within the skill of one in the art. The azomethine and epoxy resin may be reacted by any number of conventional techniques for such reactions, which optimal techniques would be dependent on the particular reactants and product formed. For example, the azomethine and the epoxy resin may be mixed together and heated to react the materials and to form the reaction product. Another technique comprises reacting the azomethine and epoxy resin in solvent at elevated temperatures to form the polyether product.

The invention will be further understood by referring to the following detailed examples. It should be understood that the specific examples are presented by way of illustration and not by way of limitation.

EXAMPLE 1

Terephthaldialdehyde (18.4 g) and p-aminophenyl (30 g) are dissolved separately in 100 ml of dimethylformamide. The two solutions are mixed and were stirred at room temperature for one hour. The solution is then poured into 500 ml of water to precipitate the product. It is recrystallized from acetone (m.p. 262°–256° C.).

The above dihydroxy azomethine, 1.7 g, is mixed with triepoxy Araldite MY0500 (Ciba Geigy), 1.9 g, and the mixture is heated at 150° C. with stirring to obtain a homogeneous mixture. It is placed in an oven at 170° C. for one hour; a hard cured polymeric material is obtained. The softening point of the material is 167° C.

EXAMPLE 2

One gram of the dihydroxyl azomethine from Example 1 and 1.5 g of Epon 828 (Shell Chem. Co.) are heated in an aluminum pan to obtain a homogeneous melt. The pan is then placed in an oven at 170° C. for one hour. The softening point of the cured material is 107° C.

EXAMPLE 3

The procedure described in Example 2 is repeated by employing 1 g of the dihydroxyl azomethine and 2 g of the epoxy. The softening point of the cured material is 69.6° C.

EXAMPLE 4

The procedure described in Example 2 is repeated with 1 g of the dihydroxyl azomethine and 3.5 g of the epoxy. The softening point is 54.2° C. The infrared spectrum shows the presence of small amount of unreacted epoxy.

EXAMPLE 5

Two grams of the azomethinediphenol from Example 1 and 2.9 g of tetraepoxy Araldite MY720 (Ciba-Geigy) are taken up 15 ml dimethyl formamide and the mixture is heated with stirring to obtain a solution. The solution is drawn on a steel panel and is baked at 170° C. for one hour to obtain a hard, solvent resistant coating.

EXAMPLE 6

Terephthaldialdehyde (18.4 g) and m-aminophenol (30 g) are dissolved separately in acetone. The two solutions are mixed and are stirred well at room temperature. The product is obtained as yellow crystals.

The above dihydroxy azomethine, 1.5 g, is mixed with triepoxy Araldite MY0500 (Ciba-Geigy), 1.8 g, and the mixture is heated at 100° C. to obtain a homogeneous mixture. The mixture is cured at 170° C. for one hour; the softening point is 165° C.

EXAMPLE 7

One gram of the diphenol from Example 6 and 1.5 g Epon 828 (Shell Chem. Co.) are heated in an aluminum pan to obtain a homogeneous melt. This pan is then placed in an oven at 170° C. for one hour. The softening point of the cured material is 98° C.

EXAMPLE 8

One gram of the diphenol from Example 6 and 1.9 g of tetraepoxy Araldite MY720 (Ciba-Geigy) are mixed in an aluminum pan and heated at 100° C. with stirring to obtain a homogeneous melt. The melt is cured at 170° C. for one hour; the softening point is 173° C.

EXAMPLE 9 p-phenylenediamine (10.8 g) and p-hydroxybenzaldehyde (24.4 g) are dissolved separately in acetone and the two solutions are mixed at room temperature with stirring. Part of the acetone is evaporated and the product is obtained as brownish yellow crystals.

One gram of the above product and 1.2 g triepoxy Araldite MY0500 (Ciba-Geigy) are heated at 100° C. with stirring to obtain a homogeneous melt. The melt is cured at 170° C. for one hour; the softening point is 162° C.

EXAMPLE 10

Two grams of the diphenol from Example 9 and 3 g of Epon 828 (Shell Chem. Co.) are heated in an aluminum pan to obtain a homogeneous melt. The pan is then placed in an oven at 170° C. for one hour. The softening of the cured material is 101° C.

EXAMPLE 11

Preparation of the dihydroxyazomethine is carried out as described in Example 9 from m-phenylenediamine and p-hydroxybenzaldehyde.

One gram of the above product and 1.2 g of triepoxy Araldite MY0500 (Ciba-Geigy) are heated at 100° C. with stirring to obtain a homogeneous melt. The melt is cured at 170° C. for one hour; the softening point is 157° C.

EXAMPLE 12

One gram of the diphenol from Example 11 and 1.5 g of Epon 828 (Shell Chem. Co.) are heated in an aluminum pan to obtain a homogeneous melt. The pan is then placed in an oven at 170° C. for one hour. Softening point of the cured material is 103° C.

EXAMPLE 13

Preparation of dihydroxyazomethine is carried out as described in Example 9 by employing p-phenylene-diamine and m-hydroxybenzaldehyde. One gram of the above product and 1.3 g of triepoxy Araldite MY0500 (Ciba-Geigy) are heated at 110° C. with stirring to obtain a homogeneous melt. The melt is cured at 170° C. for one hour; the softening point is 149° C.

EXAMPLE 14

One gram of the diphenol from Example 1 and 1.5 g of Epon 828 (Shell Chem. Co.) are heated in an aluminum pan to obtain a homogeneous melt. The pan is then placed in an oven at 170° C. for one hour. The softening point of the cured material is 104° C.

EXAMPLE 15

P-aminopnenyl sulfone (12.4 g) and p-hydroxybenzaldehyde (12.2 g) are dissolved separately in acetone and the two solutions are mixed with stirring at room temperature. Evaporation of acetone produces the product as a yellow solid.

The above dihydroxyazomethine, 1.8 g, is mixed with triepoxy Araldite MY0500 (Ciba-Geigy), 1.7 g, and the mixture is heated at 150° C. with stirring to obtain a homogeneous melt. The melt is cured at 170° C. for one hour; the softening point of the material is 179° C.

While particular embodiments of the invention have been described, it will be obvious to those skilled in the art that various changes and modifications may be made without departing from the invention, and it is intended to cover in the appended claims all such modifications and equivalents as fall within the true spirit and scope of this invention.

I claim:

1. Polyether products having high glass temperatures and being produced by reacting:
    I. epoxy resin, and
    II. hydroxyl terminated aromatic azomethines formed by reacting:
    (A) aromatic compounds having the formula:

ORC-X-CRO wherein X is a phenyl group, each R is H or an alkyl group having 1–5 carbon atoms, and the CRO groups are linked through X at the 1,3 or 1,4 positions; and (B) compounds having the formula $H_2N$-Y-OH wherein Y is a phenyl or pyridine group and the $H_2N$ group and the OH group are linked through Y at the 1,3 or 1,4 positions,
    said compounds (A) and (B) being reacted in about a 1:2 molar ratio and under conditions wherein said CRO group of (A) and said $NH_2$ group of (B) react.

2. Polyether product according to claim 1, wherein R is H.

3. Polyether product according to claim 1, wherein the CRO group are linked through X at the 1,4 positions.

4. Polyether product according to claim 1, wherein the $NH_2$ group and the OH group are linked through Y at the 1,4 positions.

5. Polyether product according to claim 1, wherein, at most, two hydrogens of said phenyl or pyridine group are substituted by non-interfering functionality.

6. Polyether product according to claim 1, wherein said epoxy resin is selected from the group consisting of diepoxide resins.

7. Polyether product according to claim 1, wherein said epoxy resins is selected from epoxy resins having, on average, at least three epoxide groups per molecule.

* * * * *